(12) United States Patent
Zhang

(10) Patent No.: US 8,322,521 B2
(45) Date of Patent: Dec. 4, 2012

(54) CHAIN CONVEYOR APPARATUS

(75) Inventor: Xiao-Gang Zhang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 394 days.

(21) Appl. No.: 12/721,646

(22) Filed: Mar. 11, 2010

(65) Prior Publication Data

US 2011/0048902 A1     Mar. 3, 2011

(30) Foreign Application Priority Data

Aug. 31, 2009   (CN) .......................... 2009 1 0306411

(51) Int. Cl.
*B65G 39/10*     (2006.01)
(52) U.S. Cl. ........................................................ 198/842
(58) Field of Classification Search .................. 198/837, 198/839–842, 850–853, 831, 860.1; 474/140, 474/144, 151
See application file for complete search history.

(56) References Cited

U.S. PATENT DOCUMENTS

| | | | | |
|---|---|---|---|---|
| 3,422,947 A * | 1/1969 | Freitag, Jr. et al. | ........... | 198/321 |
| 3,442,368 A * | 5/1969 | Heifetz | ......................... | 198/733 |
| 3,590,984 A * | 7/1971 | Nolte | ............................. | 198/806 |
| 3,653,493 A * | 4/1972 | Kerr | .............................. | 198/840 |
| 4,720,008 A * | 1/1988 | Ufland | ........................ | 198/841 |
| 5,217,414 A * | 6/1993 | Coccolo | ........................ | 474/160 |
| 5,679,084 A * | 10/1997 | Daniels, III | .................. | 474/140 |
| 5,725,450 A * | 3/1998 | Huskey | ........................ | 474/116 |
| 6,053,307 A * | 4/2000 | Honda | ......................... | 198/839 |
| 6,083,132 A * | 7/2000 | Walker | ........................ | 474/111 |
| 6,533,690 B2 * | 3/2003 | Barnett | ........................ | 474/140 |
| 6,902,053 B1 * | 6/2005 | Long | ............................. | 198/840 |
| 7,131,531 B1 * | 11/2006 | Ryan | ............................. | 198/842 |

* cited by examiner

*Primary Examiner* — Gene Crawford
*Assistant Examiner* — William R Harp
(74) *Attorney, Agent, or Firm* — Altis Law Group, Inc.

(57) ABSTRACT

A chain conveyor apparatus includes a chain, two sprockets, a pressing member and a holding member. The chain includes a plurality of lower link plates. The two sprockets engage with the chain. The pressing member is disposed adjacent to one of the sprockets. The holding member is opposite to the pressing member. The lower link plates are pressed to moves in the pressing member, and are supported to move in the holding member.

4 Claims, 6 Drawing Sheets

CHAIN CONVEYOR APPARATUS

BACKGROUND

1. Technical Field

The present disclosure generally relates to a chain conveyor apparatus and, particularly, to a chain conveyor apparatus that provides a better engagement between chains and sprockets at different heights.

2. Description of Related Art

Commonly in factory and warehouse settings, articles are moved from one place to another by a chain conveyor apparatus. The chain conveyor apparatus includes two sprockets and a chain rotatably connected to the sprockets. When conveying the articles between locations of differing heights, the sprockets need to be positioned at different heights. However, gravity of the chain and pressing force of the conveyed articles will cause one portion of the chain adjacent to the sprockets to easily break away from the sprockets reducing productivity and causing costly damage.

Therefore, there is room for improvement within the art.

BRIEF DESCRIPTION OF THE DRAWINGS

Many aspects of the chain conveyor apparatus can be better understood with reference to the following drawings. The components in the drawings are not necessarily drawn to scale, the emphasis instead being placed upon clearly illustrating the principles of the chain conveyor apparatus. Moreover, in the drawings, like reference numerals designate corresponding parts throughout the several views, in which.

DETAILED DESCRIPTION

Figure 1:
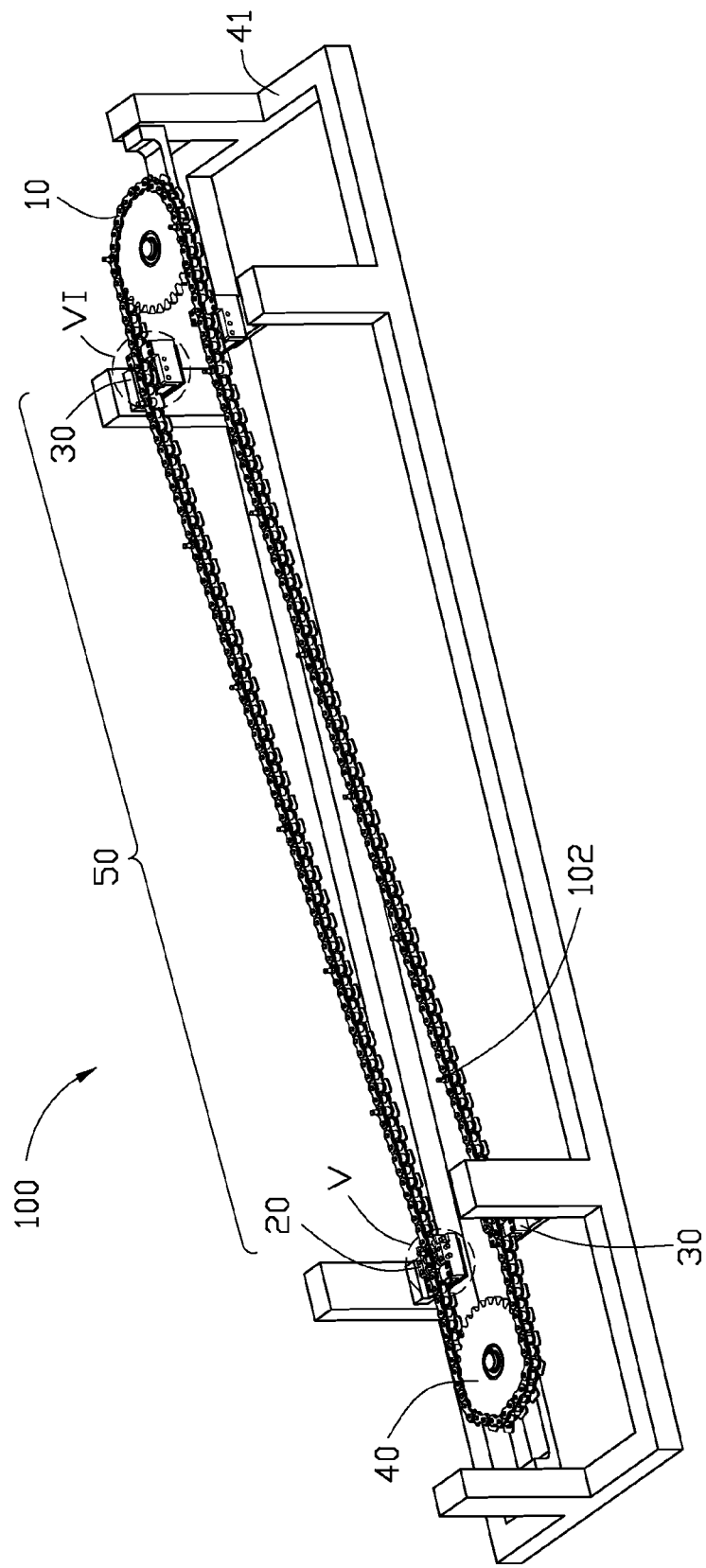
FIG. 1 is an isometric view of an exemplary embodiment of a chain conveyor apparatus.

FIG. 1 shows a chain conveyor apparatus 100 for conveying articles to different heights. The chain conveyor apparatus 100 includes a chain 10, a frame 41, two sprockets 40, and an adjustment mechanism 50. The frame 41 is used for fixing the sprockets 40 and the adjustment mechanism 50. The adjustment mechanism 50 includes two pressing members 20 and two holding members 30 for securing a stable engagement between the chain 10 and the sprockets 40.

Figure 2:
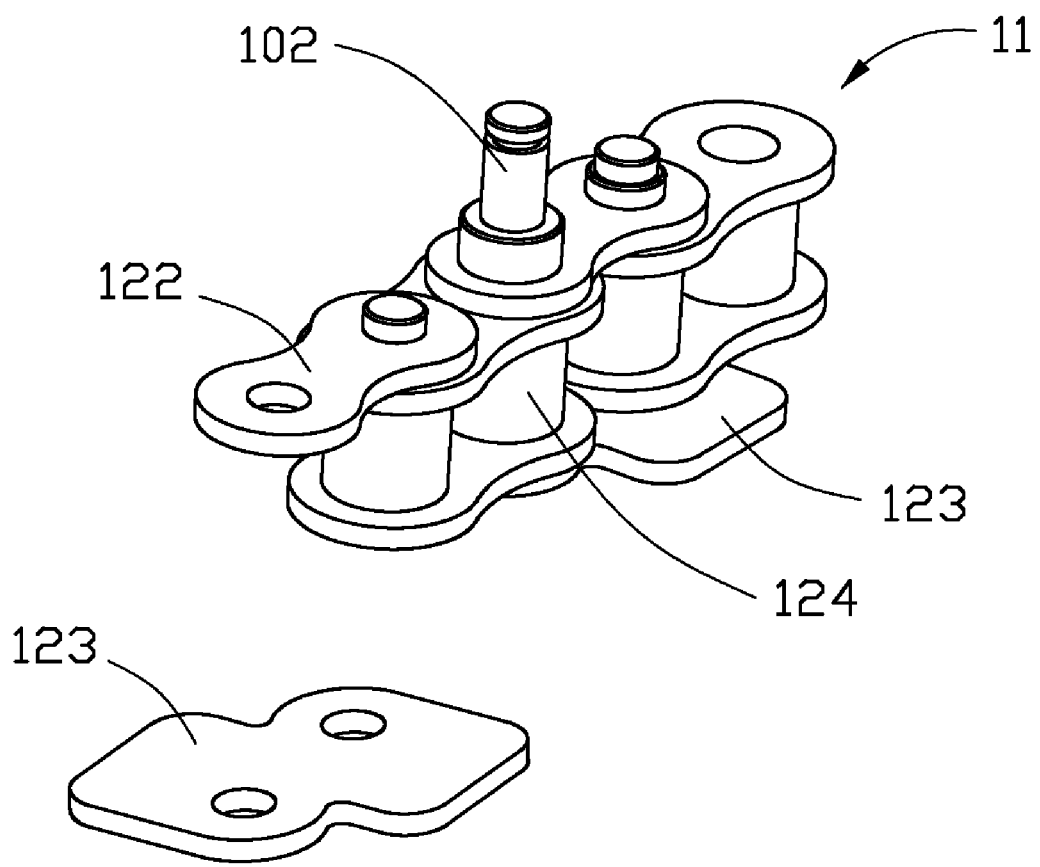
FIG. 2 is an enlarged view of one portion of the chain in FIG. 1.

Referring to FIG. 2, the chain 10 forms a plurality of pins 102 for attaching articles to the chain 10. The chain 10 includes a plurality of link units 11 connected to each other. Each link unit 11 includes an upper link plate 122, a lower link plate 123, and a knuckle 124 therebetween. The upper link plate 122 has a symmetric figure 8 shape. The knuckle 124 is rotatably disposed between the upper link plate 122 and the lower link plate 123. The lower link plate 123 has an offset figure 8 shape. The chain 10 includes a repeating pattern of link plates in which two upper link plates 122 are situated side by side, and constitute one link. The sprockets 40 are rotatably connected to the frame 41, and may be driven by a motor (not shown). The sprockets 40 further cause the chain 10 to move.

Figure 3:
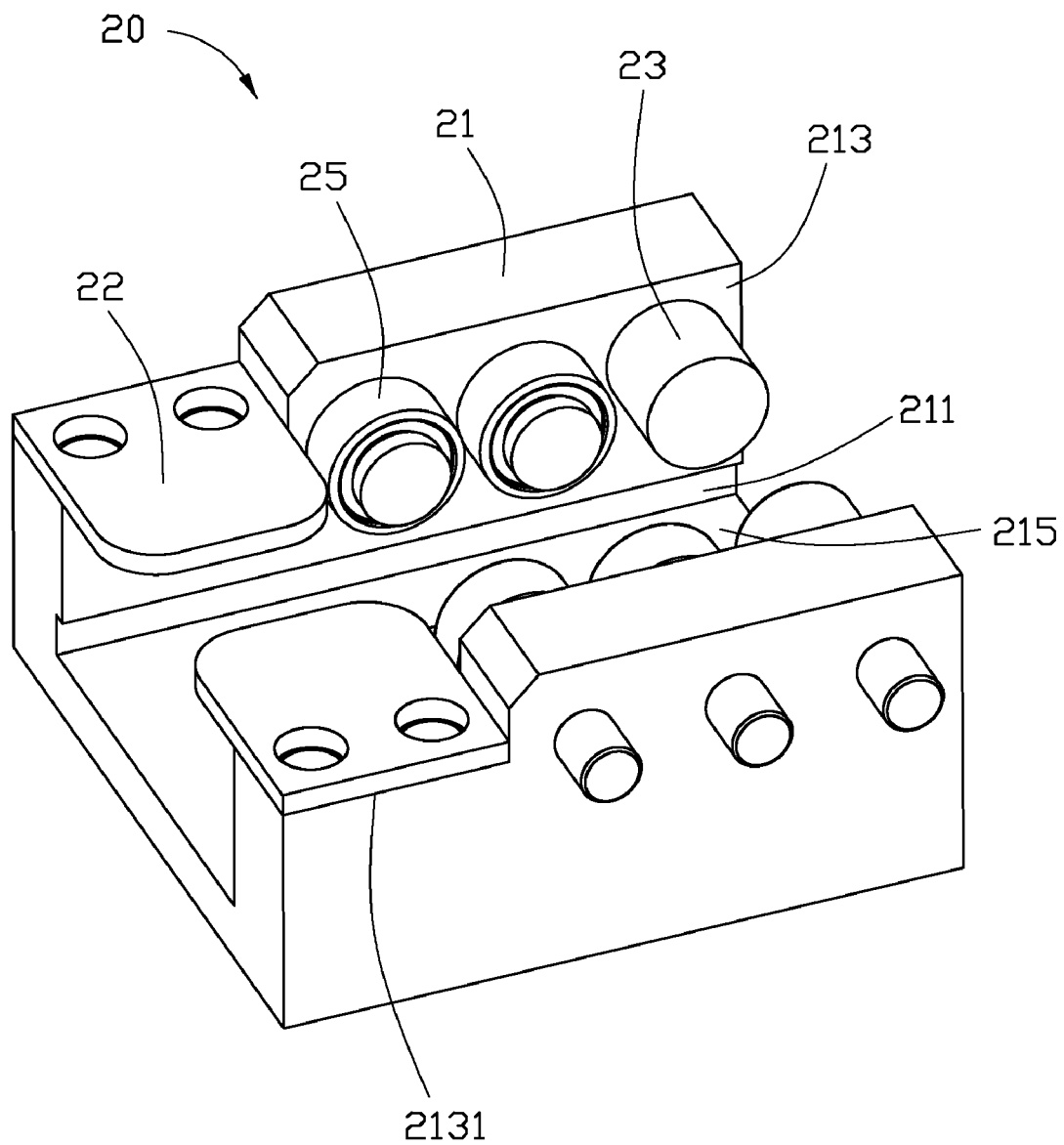
FIG. 3 is an isometric view of a pressing member in FIG. 1.
Figure 5:
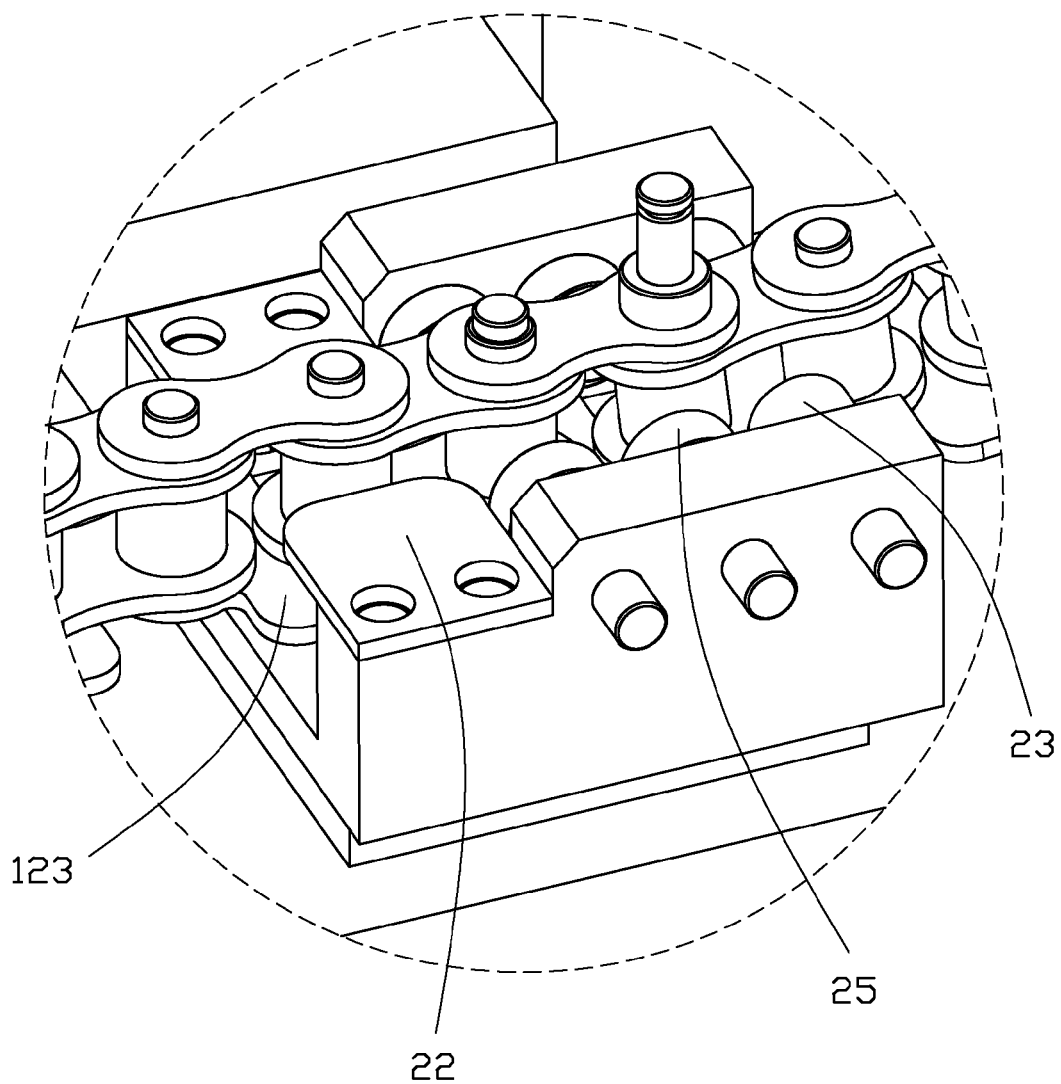
FIG. 5 is an enlarged view of circled portion V of FIG. 1.

Either of two pressing members 20 and either of two holding members 30 are respectively positioned at two sides of a corresponding sprocket 40. Referring to FIGS. 3 and 5, each pressing member 20 is used for pressing the lower link plates 123 adjacent to the sprocket 40 at the same plane. The pressing member 20 includes a seat 21. The seat includes two stepped sidewalls 213 and a bottom wall 215, thereby defining a cavity 211. The cavity 211 communicates with two ends of the seat 21. Two opposite limited plates 22 respectively extend from lower portions of the stepped sidewalls 213. Two ball bearings 25 and a needle bearing 23 extend from a higher portion of each stepped sidewall 213. Peripheral surfaces of the ball bearings 25 and the needle bearing 23 are coplanar. When the chain 10 is caused to move in the cavity 211 of each of the pressing members 20, the ball bearings 25 and the needle bearings 23 will rotate on the lower link plates 123 to keep the lower link plates 123 at the same plane.

Figure 4:
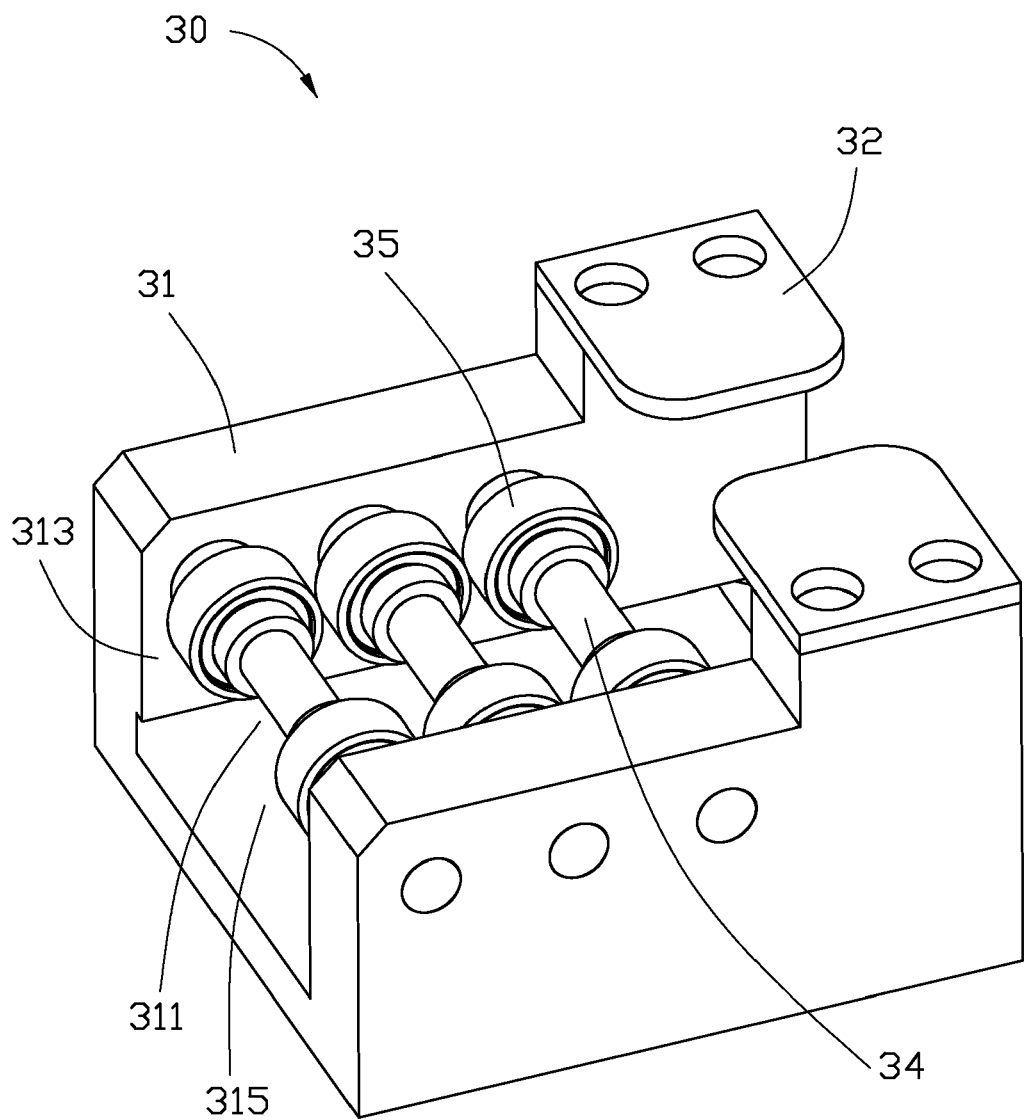
FIG. 4 is an isometric view of a holding member in FIG. 1.
Figure 6:
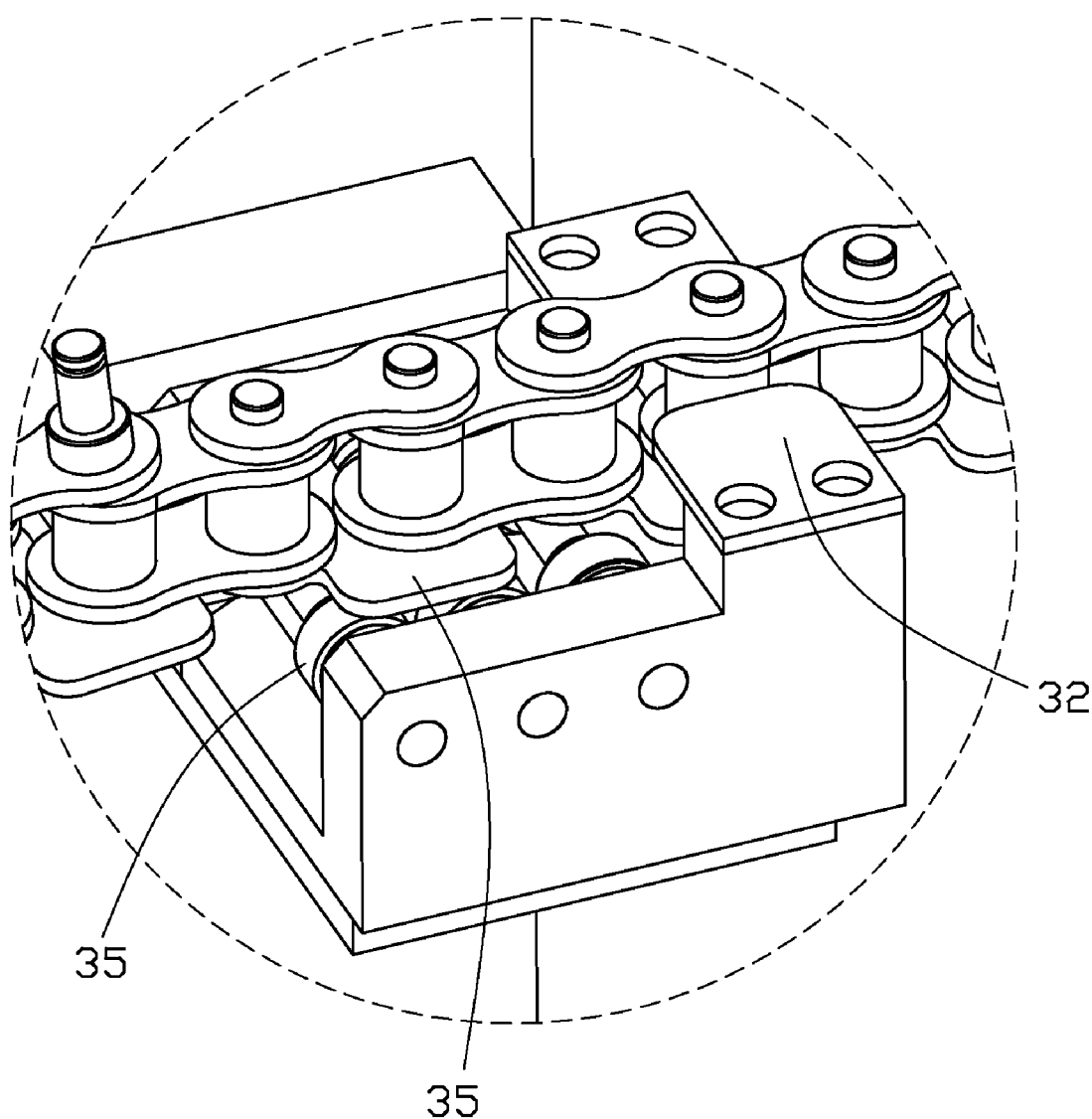
FIG. 6 is an enlarged view of circled portion VI of FIG. 1.

Referring to FIGS. 4 and 6, each holding member 30 is used for supporting the lower link plates 123 adjacent to the sprocket 40 at the same plane. The holding member 30 includes a base 31. The base 31 includes two stepped sidewalls 313 and a bottom wall 315, thereby defining a channel 311. The channel 311 communicates with two ends of the base 31. Two opposite extended plates 32 extend from higher portions of the stepped sidewalls 313. Three parallel shafts 34 are fixed to lower portions of two stepped sidewalls 313. A ball bearing 35 is positioned at each of two ends of each shaft 34. Peripheral surfaces of the ball bearings 35 are coplanar. When the chain 10 moves in the channel 311 of each of the holding members 30, the lower link plates 123 will move on the ball bearings 35 to keep the lower link plates 123 at the same plane.

In use, when the chain 10 moves along two sprockets 40, the pressing members 20 and the holding member 30 keep the chain 10 at the same plane as the adjacent sprocket to reduce the influence of gravity acting on the chain and the pressing force from articles. In addition, a stable engagement between the chain 10 and the sprocket 40 may be provided. The lower link plate 123 adopts an asymmetric shape and is wider, and is easily adjusted to be coplanar.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A chain conveyor apparatus comprising:
   a chain including a plurality of lower link plates;
   two sprockets engaging with the chain;
   each of two pressing members disposed adjacent to one side of one of the sprockets, each pressing member including a seat with two first stepped sidewalls, two first ball bearings and a needle bearing extending from each first stepped sidewall, the first ball bearings and the needle bearing being coplanar; and
   each of two holding members disposed adjacent to another side of one of the sprockets and facing each pressing member, each holding member including a base with two second stepped sidewalls, a plurality of parallel shafts being fixed to two second stepped sidewalls, a second ball bearing being positioned at each of two ends of each shaft, the second ball bearings being coplanar;
   wherein the lower link plates move in the pressing members, the first ball bearings and the needle bearing rotate on the lower link plates to hold the lower link plates at the same plane, and the lower link plates are supported to move in the holding members, the second ball bearing positioned under the lower link plates to hold the lower link plates at the same plane.

2. The chain conveyor apparatus as claimed in claim 1, wherein each lower link plate has a figure 8 shape.

3. The chain conveyor apparatus as claimed in claim 1, wherein two limited plates respectively extend from the first stepped sidewalls to limit the chain.

4. The chain conveyor apparatus as claimed in claim 1, wherein two extended plates respectively extend from the second stepped sidewalls.

* * * * *